(12) United States Patent
Hall et al.

(10) Patent No.: US 11,227,451 B2
(45) Date of Patent: Jan. 18, 2022

(54) MONITORING SYSTEM FOR DETERMINING A VEHICLE MAINTENANCE CONDITION BASED ON WEIGHT

(71) Applicant: Hall Labs LLC, Provo, UT (US)

(72) Inventors: David R. Hall, Provo, UT (US); Michael Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 340 days.

(21) Appl. No.: 16/214,291

(22) Filed: Dec. 10, 2018

(65) Prior Publication Data

US 2019/0180528 A1 Jun. 13, 2019

Related U.S. Application Data

(60) Provisional application No. 62/609,073, filed on Dec. 21, 2017, provisional application No. 62/596,348, filed on Dec. 8, 2017.

(51) Int. Cl.
| | |
|---|---|
| *G07C 5/08* | (2006.01) |
| *G07C 5/00* | (2006.01) |
| *G01G 19/02* | (2006.01) |
| *G01G 19/12* | (2006.01) |
| *G01G 23/00* | (2006.01) |
| *G01G 23/37* | (2006.01) |

(52) U.S. Cl.
CPC ........... *G07C 5/0808* (2013.01); *G01G 19/02* (2013.01); *G01G 19/12* (2013.01); *G01G 23/005* (2013.01); *G07C 5/006* (2013.01); *G07C 5/008* (2013.01); *G01G 23/3742* (2013.01)

(58) Field of Classification Search
None
See application file for complete search history.

(56) References Cited

U.S. PATENT DOCUMENTS

| | | | | |
|---|---|---|---|---|
| 7,024,291 | B2* | 4/2006 | Sudou | G07C 5/006 340/438 |
| 2002/0059075 | A1* | 5/2002 | Schick | B61L 27/0094 701/31.4 |
| 2006/0104404 | A1* | 5/2006 | Blackburn | G07C 5/085 377/27 |
| 2019/0035170 | A1* | 1/2019 | Dede | G06Q 10/1095 |

* cited by examiner

*Primary Examiner* — Lail A Kleinman

(57) ABSTRACT

The invention is a monitoring system for determining a vehicle maintenance condition based on weight. The system includes a monitoring station, a weight determination system, a data input device configured to receive input data, and a processing device. The processing device includes a processor and non-volatile memory. The processor is configured to receive load ratings for a tow vehicle and tow equipment, receive maintenance requirements for the tow vehicle and the tow equipment, receive vehicle use requirements for the tow vehicle and the tow equipment, receive weight data from the weight determination system, and receive the input data from the data input device. Additionally, the processor is configured to determine at least one maintenance condition based on the load ratings, the weight data, and the input data. The processor is also configured to send the maintenance condition data to the monitoring system and communicate the maintenance condition to a user.

18 Claims, 6 Drawing Sheets

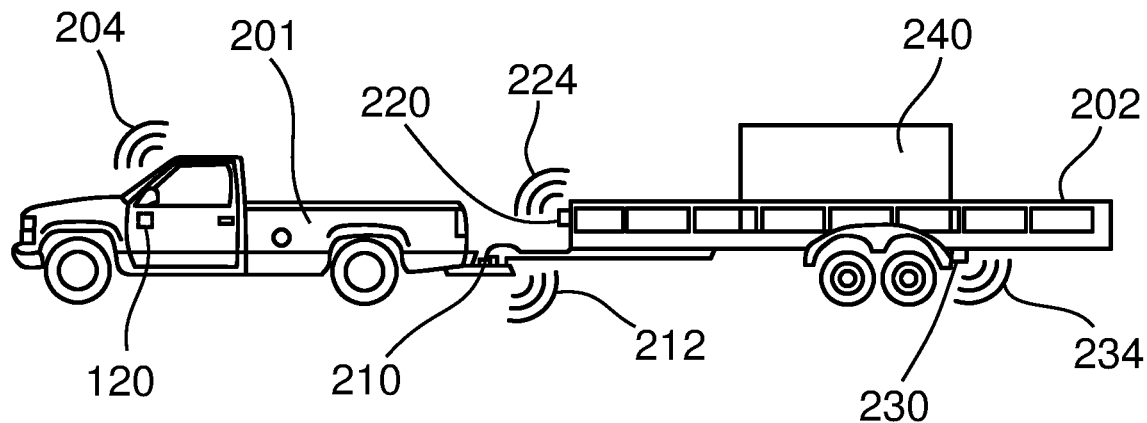
FIG. 2A
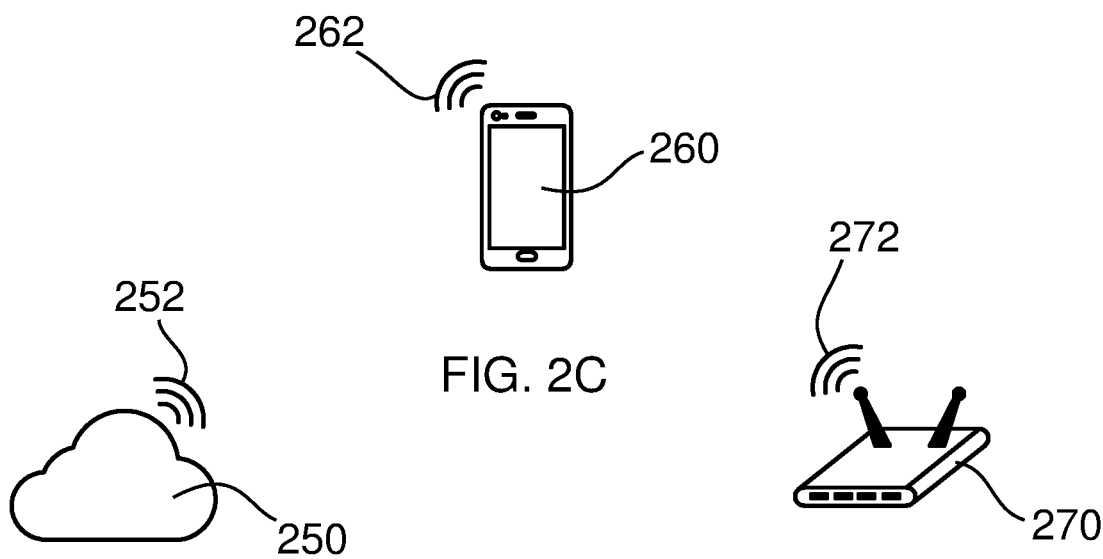
FIG. 2B
FIG. 2C
FIG. 2D

MONITORING SYSTEM FOR DETERMINING A VEHICLE MAINTENANCE CONDITION BASED ON WEIGHT

CROSS-REFERENCE TO RELATED APPLICATIONS

The present application is a continuation-in-part of U.S. Provisional Application No. 62/596,348, filed Dec. 8, 2017, entitled "Optimization of Fleet Vehicle Usage based on Weight (OFVU)" and a continuation-in-part of U.S. Provisional Application No. 62/609,073, filed Dec. 21, 2017, entitled "Vehicle Maintenance based on Weight (VMW)". The entire disclosures of these prior applications are incorporated by reference.

TECHNICAL FIELD

This invention generally relates to systems that determine a vehicle maintenance condition based on weight.

BACKGROUND

Many factors affect the maintenance and use of a tow vehicle under various driving conditions. One of the factors that has a significant impact on the maintenance of a tow vehicle and trailer is the weight of the load(s) being hauled. Vehicle and equipment manufacturers normally provide weight ratings and recommendations for a tow vehicles, trailers and tow equipment connected to the vehicle and trailer. Users may not know which vehicles and trailers are being overused when selecting a vehicle to haul a load. A user may also not know what kind of maintenance is required based on the historic loads hauled by a given tow vehicle.

Currently, a fleet vehicle company or vehicle owner may not have any way to determine how much weight is being hauled by a vehicle, or weight on the trailer. In some cases, the fleet vehicle company may have a scale to determine the weight when a vehicle begins a trip, however if the weight changes after the vehicle has made a few stops (after dropping off packages, for example), the new lower weight may not be known. This also may apply to a material delivery truck such as a cement truck. Real-time weight measurement at each stop is needed in order to determine maintenance and equipment use requirements.

Maintenance for vehicles that have minimal use or are not typically used for hauling heavy materials may not have as frequent maintenance issues as vehicles that are used to haul heavier weights. Heavy use vehicles may include trucks that are used as vehicles to tow trailers for example. In this case, the oil may need to be changed more often than a similar vehicle that is normally used for light duty (light loads or no extra load).

In some cases, specific vehicles may be overused (typically carrying higher weights), while other vehicles in the same fleet may be underused (carrying lighter loads). The fleet vehicle company currently does not have the ability to monitor and report the weight of each vehicle in the fleet on a daily and hourly basis. This information is needed to determine maintenance schedules for each vehicle and enable the maintenance to be done more frequently for trucks that have heavier use. In addition to vehicle maintenance, the actual use of vehicles in the fleet may be determined based on this information. Vehicles that are typically underused should be rotated into the schedule of vehicles that receive heavier use. In this way, every vehicle may be maximized in use to assure that all vehicles are being utilized in the most efficient manner.

Vehicle manufacturers provide ratings for maximum payload, towing, etc. for their products. The weight being hauled by the vehicle has an impact on the structures and mechanical components of the vehicle. Exceeding the rated capacity of the vehicle may create a plethora of mechanical and structural problems that may significantly impact the safe operation of the vehicle, depending on how dramatic the rated capacity of the vehicle is being exceeded.

Therefore, a system is needed to identify maintenance conditions and control the use of each vehicle in a fleet. The system should also determine a daily use schedule of vehicles to assure that the right vehicles are being used to serve the appropriate loads. Selection of the correct tow vehicle and trailer for the specific task should be identified and controlled to assure that each vehicle is receiving the required maintenance and use based on the weight being hauled.

SUMMARY

In one aspect, the invention is a monitoring system for determining a vehicle maintenance condition based on weight. The system includes a monitoring station, a weight determination system, a data input device configured to receive input data, and a processing device. The processing device includes a processor and non-volatile memory. The processor is configured to receive load ratings for a tow vehicle and tow equipment, receive maintenance requirements for the tow vehicle and the tow equipment, receive vehicle use requirements for the tow vehicle and the tow equipment, receive weight data from the weight determination system, and receive the input data from the data input device. Additionally, the processor is configured to determine at least one maintenance condition based on the load ratings, the weight data, and the input data. The processor is also configured to send the maintenance condition data to the monitoring system and communicate the maintenance condition to a user.

In a preferred embodiment, the monitoring system may communicate a maintenance condition to a monitoring station and to a user. The monitoring system may automatically set maintenance conditions or adjust user selected settings based on weight. The monitoring system may further enable automatic adjustments to a vehicle's operational systems within a vehicle and associated equipment to be made based on the weight and the maintenance conditions of the vehicle including trailer weight if applicable. The monitoring system may inform the control systems that control the operation of the vehicle regarding weight so that adjustments to driving characteristics related to maintenance conditions may be made. The monitoring system may further enable automatic adjustments to a vehicle's control settings or other vehicle systems that impact maintenance conditions within a vehicle to be made based on the weight. The monitoring system may further build a model of these adjusted maintenance conditions for the tow vehicle and the trailer if applicable. The monitoring system may lock out a specific user or modify vehicle operation based on the maintenance condition. The monitoring system may also restrict connection of a specific trailer to a specific tow vehicle or require the specific user to enter load type or trip data.

Features and advantages of different embodiments of the invention will become more fully apparent from the following description and appended claims or may be learned by practice of the invention as set forth hereinafter.

Consistent with the foregoing, a monitoring system for determining a vehicle maintenance condition based on weight is disclosed. The objectives of the system are to automatically set maintenance conditions or adjust user selected settings based on weight. The monitoring system may further enable automatic adjustments to a vehicle's operational systems within a vehicle and associated equipment to be made based on the weight and the maintenance conditions of the vehicle including trailer weight if applicable. The monitoring system may inform the control systems that control the operation of the vehicle regarding weight so that adjustments to driving characteristics related to maintenance conditions may be made. The monitoring system may further enable automatic adjustments to a vehicle's control settings or other vehicle systems that impact maintenance conditions within a vehicle to be made based on the weight. The monitoring system may further build a model of these adjusted maintenance conditions for the tow vehicle and the trailer if applicable. The monitoring system may lock out a specific user or modify vehicle operation based on the maintenance condition. The monitoring system may also restrict connection of a specific trailer to a specific tow vehicle or require the specific user to enter load type or trip data.

In a preferred embodiment, a monitoring system for determining a vehicle maintenance condition based on weight may include a monitoring station, a weight determination system, a data input device configured to receive input data along with a processing device comprising a processor and non-volatile memory. The processor may be configured to receive load ratings for a tow vehicle and tow equipment, receive maintenance requirements for the tow vehicle and the tow equipment, receive vehicle use requirements for the tow vehicle and the tow equipment, receive weight data from the weight determination system and receive the input data from the data input device. The system may then determine at least one maintenance condition based on the load ratings, the maintenance requirements, the vehicle use requirements, the weight data, and the input data. The maintenance condition data may then be sent to the monitoring station and communicated to a user. In some cases, the user may select user defined settings via a user input device. The system may then modify the user selected settings based on the weight.

In an embodiment, the weight data may include vehicle weight. In another embodiment, the weight data may also include trailer weight. In a certain embodiment, the system may also include one or more sensors that may produce sensor data. The sensors may convert sensor data to an electrical signal and may include at least one sensor type of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In certain embodiments, the monitoring system may send at least one control command to a vehicle control system, controlling the operation of the tow vehicle based on the determined maintenance condition. The monitoring system may also send at least one control command to a hybrid vehicle control system, controlling the operation of the tow vehicle's electric motor and internal combustion engine based on the determined maintenance condition.

In one embodiment, the monitoring system may send a control command to a vehicle braking system, controlling braking force delivered to brakes based on the determined maintenance condition. In an embodiment, the input device may be an OBD device connected by a plug-in connector to a vehicle OBD port. In another embodiment, the system may send a control command to a vehicle computer server.

In an embodiment, the input device may receive and transmit data via a wireless interface. The wireless interface may utilize a protocol of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

In a certain embodiment, the processor may be configured to build a model of a set-up for a specific vehicle connected to a specific trailer. The model may determine a maintenance condition based on the data associated with the set-up for the model. The model may be stored in the non-volatile memory, and the system may communicate the maintenance condition for the model to the vehicle control system. The system may then alert the user to the maintenance condition for the model. The non-volatile memory may store factory settings and user settings specific to the model.

In an embodiment, the system may also include a cloud-based network. Factory settings, the user settings and the sensor data may be stored in the memory of the cloud-based network. The cloud-based network processor may also be configured to determine set-up specific maintenance condition settings for a specific towing set-up of tow vehicle, trailer and all associated tow equipment, and may transmit the set-up specific maintenance condition settings to the system based on the sensor data, the factory settings, and the user settings.

In certain embodiments, the data input device may include a cell phone, satellite phone, smartphone, personal digital assistant, tablet computer, laptop computer, remote control device, mobile transmitter, a mobile internet device or a combination of one or more of the same.

In certain embodiments, the system may also monitor, via the sensors, behavior of a vehicle and its components while driving on a specific trip. The system may then make adjustments to the maintenance condition and the model for the specific trip based on the specific trip sensor data and input data. This data may then be stored in the non-volatile memory. An adjusted maintenance condition model may then be determined based on the adjustments. This adjusted model may then be used for the specific trip and stored in the memory for use on future trips. In one example, a user may start a new trip in the future and the system may receive input data indicating a new set-up for this new trip. The system may determine that this new set-up matches or is similar to one of these stored adjusted maintenance condition models. In this example, the stored adjusted maintenance condition model may be determined to be the best for this new set-up. The adjusted maintenance condition may be communicated to the monitoring station.

In an embodiment, the maintenance condition may determine at least one vehicle maintenance task. In another embodiment, the maintenance condition may determine at least one vehicle use restriction.

In one embodiment, the monitoring system may receive a weight update at each stop along a trip and make an adjustment to the maintenance condition based on the weight update.

In a certain embodiment, the monitoring system may restrict access to a tow vehicle based on the maintenance condition and access to a trailer based on the maintenance condition. The access restriction may include locking out a specific user based on the maintenance condition, modifying vehicle operation controls based on the maintenance condition, restricting connection of a specific trailer to a specific tow vehicle, requiring the specific user to enter load type via the input device or requiring the specific user to enter trip data.

In other embodiments, the monitoring system may send at least one control command to a vehicle control system, controlling the operation of the tow vehicle based on the determined maintenance conditions. the monitoring system may also send at least one control command to a vehicle computer server. In an embodiment, the input device is an OBD device connected by a plug-in connector to a vehicle OBD port.

In an embodiment, the processor may be configured to build a model of a set-up for a specific vehicle connected to a specific trailer. The model may determine at least one maintenance mode based on the data associated with the set-up for the model and the model may be stored in the non-volatile memory.

In another embodiment, the monitoring system may receive user settings and may communicate the maintenance condition for the model to the vehicle control system. The monitoring system may also alert the user to the maintenance condition for the model. The non-volatile memory may store factory settings and user settings specific to the model.

In an embodiment, the monitoring system may include a cloud-based network. Factory settings, the user settings and the sensor data may be stored in the memory of the cloud-based network. The cloud-based network processor may be configured to determine set-up specific maintenance condition for a specific towing set-up of tow vehicle and trailer along with all associated tow equipment. The cloud-based network may then transmit the set-up specific maintenance condition to the monitoring system based on the sensor data, the factory settings, and the user settings.

In certain embodiments, the monitoring system may also monitor via the sensors the behavior of a vehicle and its components while driving on a specific trip and make adjustments to the maintenance mode and the model for the specific trip based on the specific trip sensor data and input data. The data may then be stored in the non-volatile memory, and an adjusted maintenance mode model may be determined based on the adjustments.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2A is an illustration of a truck pulling a flatbed trailer.

FIG. 2B shows a cloud network communicating via wireless signal.

FIG. 2C illustrates a mobile app on a mobile device.

FIG. 2D is an illustration of a wireless hub device.

DETAILED DESCRIPTION

Figure 1:
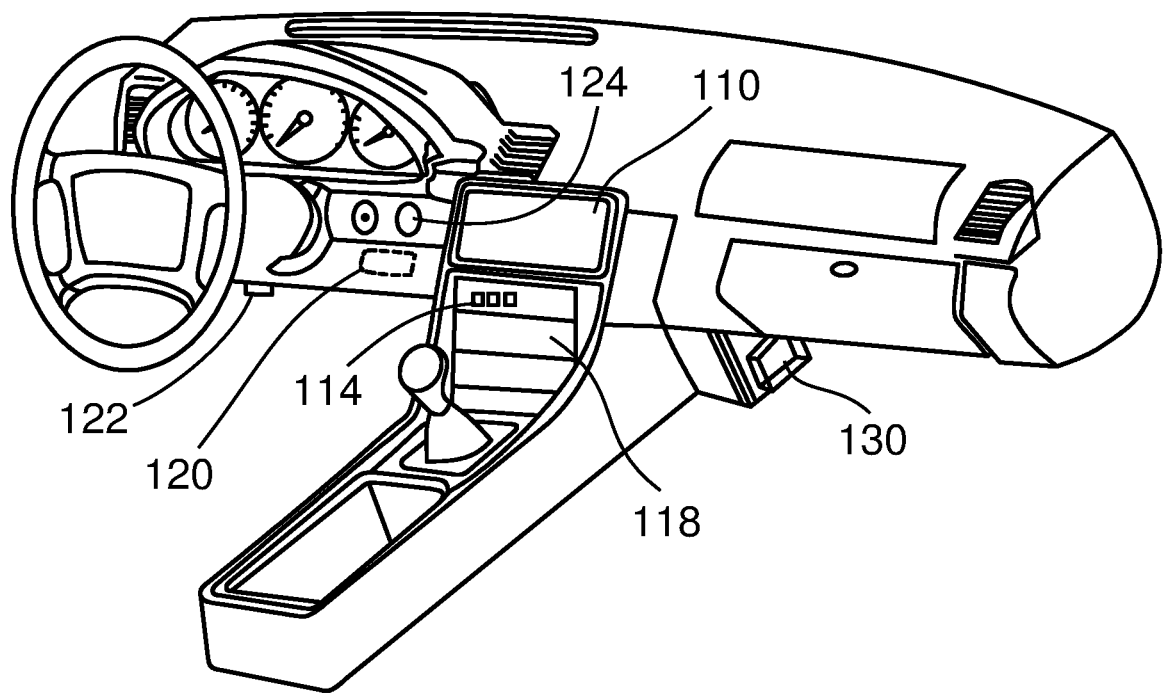
FIG. 1 is an illustration depicting a car dashboard, steering wheel and shifter.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

The term "maintenance condition" is used throughout this document and refers to both maintenance and use of vehicles and equipment. In some cases, a maintenance condition may refer to a specific condition of a vehicle or part of a vehicle such as the brakes for example. The maintenance condition may include a rating for the brakes regarding wear. The maintenance condition may include a schedule for the brakes and how long it has been since they were replaced. The schedule may also include historic load ratings (vehicle weight or trailer weight), along with sensor data related to the braking forces received over a period of time. This brake data may be included in the maintenance condition.

The maintenance condition may also comprise a schedule of use indicating which vehicles are being used by which drivers and attached to which trailers on what dates. By tracking this information, the monitoring system determine specific towing set-ups, and may communicate which vehicle is used by which driver with the appropriate trailer and tow equipment. The monitoring system may further control various vehicle control systems as needed to accommodate the requirements of the maintenance condition.

Vehicle Maintenance based on Weight (VMW) provides a way for a Fleet Vehicle Company (FVC) or vehicle owner to monitor and determine vehicle and vehicle parts maintenance schedules based on weight. Weight information from an on-board weight determination system may inform the VMW regarding vehicle weight, along with how the weight impacts wear of the vehicle and various parts and systems of the vehicle. The FVC may be a vehicle rental company, a business that provides company vehicles for their employees, a delivery service company like FedEx or UPS, a company with trucks that haul concrete, gravel or other building materials, or any other company that owns or manages multiple company vehicles. The VMW continuously monitors and measures the weight of the vehicle, including weight being hauled in the vehicle and weight being towed by the vehicle such as a trailer. This weight data is reported to the FVC to enable the maintenance schedules of company vehicles to be determined based on weight.

Currently, a FVC or vehicle owner may not have any way to determine how much weight is being hauled by a vehicle. In some cases, the FVC may have a scale to determine the weight when a vehicle begins a trip, however if the weight changes after the vehicle has made a few stops (after dropping off packages, for example), the new lower weight may not be known. This also may apply to a material delivery truck such as a cement truck.

Maintenance for vehicles that have minimal use, or are not typically used for hauling heavy materials may not have as frequent maintenance issues as vehicles that are used to haul heavier weights. Heavy use vehicles may include trucks that are used as vehicles to tow trailers for example. In this case, the oil may need to be changed more often than a similar vehicle that is normally used for light duty (light loads or no extra load).

In some cases, specific vehicles may be overused (typically carrying higher weights), while other vehicles in the same fleet may be underused (carrying lighter loads). The VMW may monitor and report the weight of each vehicle in the fleet on a daily and hourly basis. Once this information is known, the specific maintenance schedules for each vehicle may be known, enabling the maintenance to be done more frequently for trucks that have heavier use.

Vehicle manufacturers provide ratings for maximum payload, towing, etc. for their products. The weight being hauled by the vehicle has an impact on the structures and mechanical components of the vehicle. Exceeding the rated capacity of the vehicle may create a plethora of mechanical and structural problems that may significantly impact the safe operation of the vehicle, depending on how dramatic the rated capacity of the vehicle is being exceeded.

By monitoring the weight, the VMW may inform the FVC regarding the use of each vehicle, along with if and when the ratings are being approached or exceeded. Once this information is known, adjustments may be made to the maintenance schedule of each vehicle in order to assure its safe operation. Parts that receive more wear based on heavy loads may be proactively replaced ahead of time to avoid future failure due to higher use (heavy weight).

The objectives of the VMW include providing a way for a FVC or vehicle owner to determine vehicle maintenance issues and develop maintenance schedules based on vehicle weight and sensor data. The VMW continuously monitors and measures the weight of each vehicle within the fleet, including weight being hauled in the vehicle along with weight being towed by the vehicle. This weight data along with sensor data may inform a maintenance schedule for each specific vehicle. The VMW stores this maintenance information in memory and also transmits this data in real-time via wireless, cellular or satellite radio on board the vehicle.

The VMW may measure the total weight of a tow vehicle along with trailer weight (if applicable) before a trip is made. During the trip, the weight along with how the weight impacts vehicle parts and systems may be continuously monitored and reported to the FVC via a wireless system. The influence of heavy weights on each part of the vehicle may be determined by sensors during the trip. For example, accelerometers may detect aberrations that indicate the left side of the vehicle is producing more drag than the right side. This may be further be analyzed based on sensor data from the braking system or engine torque. Sensor data may reveal potential maintenance issues relating to the brakes, transmission, suspension system, or tires for example.

In many scenarios, a vehicle may be configured to tow a trailer. The amount of goods or other items being hauled in the trailer may vary from 100 kilograms or less, to many tons. The use of each trailer may also be determined by the VMW. The VMW may inform the maintenance schedule for each trailer regarding parts or systems on the trailer that require more frequent maintenance based on heavier loads being hauled.

Various types of sensors may be used to monitor and determine the weight being hauled by a vehicle. This weight data informs both the driver and the FVC regarding the weight of the vehicle including trailer weight. The VMW may provide detailed data regarding the weight of the vehicle and how this weight affects various vehicle components and systems. Brakes, suspension systems, engine, drivetrain and associated mechanical parts and systems of the vehicle may be monitored by the VMW and reported to the driver and the FVC. Weight of a trailer being towed by the vehicle and associated tow equipment may also be communicated by the VMW.

The weight of the vehicle may be monitored continuously and communicated in real-time to the driver and the FVC, and recorded in the memory of the VMW for periodic download by the FVC. By knowing the ratings and use schedules of their equipment, the FVC may assist drivers in determining which tow vehicle or trailer to use. Maintenance issues may be identified prior to failure based on use data provided by the VMW.

The VMW determines maintenance schedules based on vehicle use. Each part and system of the vehicle is monitored via on-board sensors to determine when maintenance is required. The VMW utilizes on-board weight sensing devices or equipment to determine vehicle and trailer weight in order to inform the FVC. In addition, the VMW may monitor vehicle parts and system performance prior to and after maintenance has been done. By so doing the VMW may not only determine predicted performance prior to a maintenance event, but also after a maintenance event has taken place. Each time the vehicle is loaded, the weight being hauled may influence the sensor data and the weight's impact on various systems and components in the vehicle. For example, accelerometer data while accelerating and braking will behave differently when a vehicle is fully loaded than when there is no load being hauled. Also, irregularities in brake wear on one side of the vehicle or bearings on one side may be exhibited by the sensor data (accelerometer data or the like) more prominently when carrying a heavier load. This maintenance data is communicated to the driver and FVC by the VMW.

Weight data and sensor data is communicated to the FVC which may in turn determine whether the load being hauled by the vehicle is within the ratings of the vehicle or trailer. For loads that exceed manufacturer's recommendations, this info may be communicated to the driver and the FVC so that adjustments may be made. Manufacturer's recommendations for heavier loads may require accelerated maintenance of certain parts of the system. In addition, the user or FVC may enter more stringent maintenance schedules based on weight and vehicle use that may be more aggressive than the manufacturer's recommendations.

In certain embodiments, the VMW monitors the weight of a vehicle and its associated equipment. This equipment may include a trailer, hitch and other components that may be affected by the weight loaded onto the vehicle or trailer. For example, if very heavy weights are loaded into the bed of a truck, the excessive weight may actually exceed the ratings of the truck. Normally, the FVC may not know that the truck is being overloaded. The VMW may monitor the actual weight being loaded and transmit this information to the FVC. In some cases, the FVC may have a sliding scale of weights that are allowed for specific vehicles. The maintenance schedule may reflect this by accelerating or moving forward service dates based on higher use. Maintenance schedules may also be developed and tracked for trailers.

In another embodiment, weight data is relayed in real-time, so that the FVC has the option of notifying the driver when a load is more than the truck is rated for. In certain embodiments, the FVC may send notifications to the driver in real-time indicating the weight, and if it exceeds the rating of the vehicle. The driver has the option to not pick up any more loads and return to the FVC main facility to unload.

In some embodiments, the VMW may monitor via sensors or other system devices or components, other vehicle components such as the brakes or suspension system. Excessive weight may influence the behavior of the suspension system or braking system. The engine may also be affected by excessive weight. Data relating to these systems in response to the excess weight may be communicated to the FVC.

The range of allowable weights may be communicated to the driver in real-time, allowing the driver to make adjustments before proceeding. In some cases, the driver may choose to exceed even the highest allowable weight limits. In cases where the overage is not detected until the vehicle is already in motion, the VMW may send audible and visual alerts to the driver that weight limits have been exceeded prior to any control actions.

In addition to reporting how weight affects components of the vehicle, the VMW may also monitor the weight of trailers and associated towing equipment attached to the vehicle. For example, in some cases a tow vehicle without VMW may be utilized to tow a trailer with VMW. In this case, the trailer may have sensors and devices that monitor the weight of the trailer and its load. In this way, the FVC may be able to monitor the trailer weight. Other equipment related to the towing may also be monitored. In some cases, the weight of the trailer may be within limits, however the weight on the hitch (tongue weight) may exceed specifications. In this case, the FVC may alert the driver that the load on the trailer may need to be adjusted to reduce the tongue weight on the hitch. This alert may be automatically communicated to the driver via an app on their phone or mobile device.

Once maintenance issues have been identified by the VMW, the user may be prompted to carry out a maintenance task. The task may be changing the motor oil for example. Once the oil has been changed, the app may prompt the user to indicate the time the task was completed. In certain embodiments, wherein a part or parts are replaced (like a brake job for example), the user may be prompted to indicate not only the date but also the brand and type of brakes that were installed. Specifics regarding warranty and expected life of the replacement parts may also be communicated to the VMW. In this way, the VMW may be able to predict when future maintenance of the replaced part should take place, based on the weight being hauled along with sensor data.

In other embodiments, this vehicle and part specific maintenance information may be communicated to the VMW by the FVC or the repair shop. Maintenance data may be communicated via a wireless (such as WIFI or Bluetooth or similar) system to the VMW. In this way, the maintenance schedule may be kept current without input from the user or driver.

The VMW continuously monitors and measures the weight of each vehicle within the fleet, including weight being hauled in the vehicle along with weight being towed by the vehicle. This weight data along with sensor data may inform a maintenance schedule for each specific vehicle. The VMW stores this maintenance information in memory and also transmits this data in real-time via wireless, cellular or satellite radio on board the vehicle.

The VMW may measure the total weight of a tow vehicle along with trailer weight (if applicable) before a trip is made. During the trip, the weight may be continuously monitored and reported to the FVC via a wireless system. The influence of heavy weights on each part of the vehicle may be determined by sensors during the trip. For example, accelerometers may detect aberrations that indicate the left side of the vehicle is producing more drag than the right side. This may be further be analyzed based on sensor data from the braking system or engine torque. Sensor data may reveal potential maintenance issues relating to the brakes, transmission, suspension system, or tires for example.

In many scenarios, a vehicle may be configured to tow a trailer. The amount of goods or other items being hauled in the trailer may vary from 100 kilograms or less, to many tons. The use of each trailer may also be determined by the VMW. The VMW may inform the maintenance schedule for each trailer regarding parts or systems on the trailer that require more frequent maintenance based on heavier loads being hauled.

In certain embodiments, the drive force or axle torque may be determined by sensors. After the weight is known, the axle torque may be calculated for accelerations (foot off the brake). A good metric for driveline damage is revolutions at torque. An algorithm counts the revolutions of the axle at a given torque, and stores them in a histogram. i.e.

0-100 ft lbf: 30 k revs
101-200 ft lbf: 20 k revs
201-300 ft lbf: 15 k revs

This plot is then further reduced into a damage number, that may let fleet managers know when it is time to do oil changes, and other maintenance.

For braking, a similar method may be used to estimate brake damage. In this embodiment, the weight and how that weight influences braking may be determined by a brake temperature model combined with the weight profile that indicates maintenance decisions based on time at temp.

The VMW consists of software and/or firmware and other equipment or systems that enable the hardware and systems in a tow vehicle and/or in a trailer to determine the weight of the vehicle, trailer, and associated tow equipment. Data regarding weight data along with sensor data is communicated to the FVC. Weight data and sensor data is used to determine maintenance schedules for each part and system specific to each vehicle in the fleet. These maintenance schedules keep track of when each part or system is due to be replaced or have maintenance done (such as oil changes, for example). Both real-time and historical data is recorded and relayed to the FVC. The data may be sent wirelessly via a local network or a cloud network.

The VMW may include one or more of the following components:
1. Software
2. Firmware
3. Hardware
4. Sensors—electrical, electro-mechanical, automotive, chemical, navigational, thermal
5. Accelerometers
6. Processor
7. Controller or microcontroller
8. Memory or other data storage device or module
9. Wireless network device
10. Mobile device The basic process of how the VMW is used or implemented is as follows:

A user or FVC representative opens the VMW app on a mobile device (or app "on-board" vehicle for OEM implementation) that prompts the user to indicate equipment included in the system. If the equipment included is a trailer, for example, the user is prompted to indicate that the trailer is part of the system and to include the trailer and its weight. In some embodiments, the trailer and its weight are recognized by the VMW automatically so that no user interface is required. In other embodiments, the VMW is automatically started every time the vehicle is driven and communicates to the vehicle control system the weight of the loads (both loads in the bed of a truck, for example along with the trailer weight). In certain embodiments, the VMW includes sensors that recognize when equipment like a trailer is connected to the truck, and starts tracking the weight of the trailer as soon as it is hooked up.

In certain embodiments, the FVC may send alerts to the driver in real-time while driving indicating weights of loads in the vehicle and trailer weight. Any loads that are beyond recommended limits are thus known during the overloading event, and the driver may take action to adjust the loading. Any and all maintenance issues identified during a trip are also communicated to the driver and the FVC.

In other embodiments, the VMW may be implemented directly into the vehicle in a factory or OEM application. In other embodiments, the VMW may be retrofitted to an existing vehicle. In a retrofit application, the VMW may plug into the vehicle's OBD port to allow interface with the vehicle's control system. Alternatively, it may be connected wirelessly either via a wireless adapter to the OBD, or to other wireless interface devices that connect the VMW to the vehicle's control systems.

In some embodiments, the VMW may also be connected to other equipment attached to the vehicle. For example, a trailer may have sensors and allow control (trailer brakes) that may inform the VMW. In this case, the VMW may be connected to this equipment either by a hard-wire connection (via the trailer wiring connection to the vehicle) or wirelessly via wireless equipment mounted on the equipment and within the VMW. In this way, further data regarding the behavior of a trailer may be learned by the VMW through this connection to its sensors. Control of the equipment (application of the braking system for example) may also be done by the VMW. The electrical trailer brake gain signal for example may be adjusted by the VMW based on the load of the trailer. Information regarding pitch and roll of the trailer may also be communicated to the VMW by sensors on the trailer. Maintenance information for both vehicle and trailer may be communicated to the driver and to the FVC.

The VMW may also interface with autonomous or semi-autonomous vehicles, informing the control system regarding weight and the impact that weight has on the maintenance of the vehicle and its systems.

In certain embodiments, the VMW may be implemented via a local or cloud-based network. The local network may comprise the vehicle, trailer and all associated tow equipment with a specific towing set-up. For example, each component and part of the towing system (vehicle, trailer, hitch, etc.) may have a wireless network device that links them together. In this way, the VMW may communicate with all of the equipment in order to effectively monitor (via sensors) and control not only the vehicle but also the tow equipment.

In other embodiments, the VMW may further comprise connection to a cloud network. For example, user profiles, drive mode profiles, vehicle profiles, and system settings may be stored and accessed via a connection to the cloud. This connection may be via wireless devices or transmitter and receivers. In some embodiments, both monitoring and control of the VMW may also be done via the cloud.

A mobile device may also be used for a user interface with the VMW. In some cases, the processor in a mobile device along with other VMW components may be comprised within the mobile device, and the mobile device may interface with the vehicle via a wireless connection. The mobile device may allow for user data or changes to the factory presets to be entered in. The mobile device may also be used as a scanner to scan in equipment ID's to identify the specific equipment being used.

In another embodiment, the user interface with the VMW may be via the vehicle's infotainment system or other interface device on the dashboard of the vehicle.

Optimization of Fleet Vehicle Usage based on weight (OFVU) provides a way for a Fleet Vehicle Company (FVC) to monitor and determine vehicle weight, and how the weight of the vehicle influences vehicle use and maintenance. Weight information from an on-board weight determination system may inform the OFVU regarding vehicle weight and if the weight is within manufacturer's specifications. The FVC may be a car rental company, a business that provides company vehicles for their employees, a delivery service company like FedEx or UPS, a company with trucks that haul concrete, gravel or other building materials, or any other company that owns or manages multiple company vehicles. The OFVU continuously monitors and measures the weight of the vehicle, including weight being hauled in the vehicle and weight being towed by the vehicle such as a trailer. This weight data is reported to the FVC to enable the management and use of company vehicles based on weight.

Currently, a FVC may not have any way to determine how much weight is being hauled by a vehicle. In some cases, the FVC may have a scale to determine the weight when a vehicle begins a trip, however if the weight changes after the vehicle has made a few stops (after dropping off packages, for example), the new lower weight may not be known. This also may apply to a material delivery truck such as a cement truck.

The OFVU continuously monitors and measures the weight of each vehicle within the fleet, including weight being hauled in the vehicle along with weight being towed by the vehicle. The OFVU stores this historic weight information in memory and also transmits weight data in real-time via wireless, cellular or satellite radio on board the vehicle.

The OFVU may measure the total weight of a tow vehicle along with trailer weight (if applicable) before a trip is made. During the trip, the weight may be continuously monitored and reported to the FVC via a wireless system. As material is dropped off along the way at various delivery sites, the OFVU may measure the total weight at each site, enabling the OFVU to determine how much weight was delivered at each site along the way.

In some cases, specific vehicles may be overused (typically carrying higher weights), while other vehicles in the same fleet may be underused (carrying lighter loads). The OFVU may monitor and report the weight of each vehicle in the fleet on a daily and hourly basis. Once this information is known, vehicles that are typically underused may be rotated into the schedule of vehicles that that receive heavier use. In this way, every vehicle may be maximized in use to assure that all vehicles are being utilized in the most efficient manner.

Vehicle manufacturers provide ratings for maximum payload, towing, etc. for their products. The weight being hauled by the vehicle has an impact on the structures and mechanical components of the vehicle. Exceeding the rated capacity of the vehicle may create a plethora of mechanical and structural problems that may significantly impact the safe operation of the vehicle, depending on how dramatic the rated capacity of the vehicle is being exceeded. By monitoring the weight, the OFVU may inform the FVC regarding the use of each vehicle, along with if and when the ratings are being approached or exceeded. Once this information is known, adjustments may be made to the future use and loading of each vehicle.

Some fleets may have vehicles with varying ratings. For example, there may be ½ ton trucks, ¾ ton trucks along with 1-ton trucks in the fleet. By measuring the weight of each vehicle, it may be determined that one of the full 1-ton trucks is typically used with very light loads. The FVC may then inform the driver of that truck to use a lighter duty (½ ton) truck for future use based on the normal light duty use. This may reduce the overall fuel consumption for each trip on that route by using a lighter duty truck, while still maintaining a truck size that will accommodate the required loads.

In other embodiments, it may be determined by the OFVU that one of the lighter duty trucks is typically being used at or near its full capacity while other heavier duty trucks are available. The scheduled use and driver of the lighter duty truck in this case may be directed by the OFVU to use a heavier duty truck for future trips.

In many scenarios, a vehicle may be configured to tow a trailer. The amount of goods or other items being hauled in the trailer may vary from 100 kilograms or less, to many tons. The use of each trailer may also be determined by the OFVU. In some cases, certain trailers may have heavier duty use than others. The OFVU may inform the schedule and use of these trailers to even out the use to assure that each trailer is being used in the best manner. There also may be lighter duty trailers along with heavier duty trailers in the fleet.

Other information provided by the OFVU may also include the variable weight over the entire duration of a trip as material is dropped off or picked up at each site.

The objectives of the OFVU include providing a way for a FVC to monitor and determine the weight being hauled by a vehicle. This weight data informs both the driver and the FVC regarding the weight of the vehicle including trailer weight. The OFVU may provide detailed data regarding the weight of the vehicle and how this weight affects various vehicle components and systems. Brakes, suspension systems, engine, drivetrain and associated mechanical parts and systems of the vehicle may be monitored by the OFVU, and reported to the driver and the FVC. Weight of a trailer being towed by the vehicle and associated tow equipment may also be communicated by the OFVU.

The weight of the vehicle may be monitored continuously and either communicated in real-time to the driver and the FVC, or recorded in the memory of the OFVU for periodic download by the FVC. By knowing the ratings and use schedules of their equipment, the FVC may assist drivers in determining which tow vehicle or trailer to use.

The OFVU utilizes on-board weight sensing devices or equipment to determine vehicle and trailer weight in order to inform the FVC. The data is communicated to the FVC which may in turn determine whether the load being hauled by the vehicle is within the ratings of the vehicle or trailer. This information may also be used to determine schedules of use, so that each vehicle receives approximately equal use regarding loading (weight).

In certain embodiments, the OFVU monitors the weight of a vehicle and its associated equipment. This equipment may include a trailer, hitch and other components that may be affected by the weight loaded onto the vehicle or trailer. For example, if very heavy weights are loaded into the bed of a truck, the excessive weight may actually exceed the ratings of the truck. Normally, the FVC may not know that the truck is being overloaded. The OFVU may monitor the actual weight being loaded and transmit this information to the FVC. In some cases, the FVC may have a sliding scale of weights that are allowed for specific vehicles. When certain weight limits are exceeded, the FVC may assess a fee for each range of weights that are above the recommended weight limits.

In another embodiment, weight data is relayed in real-time, so that the FVC has the option of notifying the driver when a load is more than the truck is rated for. In certain embodiments, the FVC may send notifications to the driver in real-time indicating the weight, and if it exceeds the rating of the vehicle. The driver has the option to not pick up any more loads and return to the FVC main facility to unload.

In some embodiments, the OFVU may monitor via sensors or other system devices or components, other vehicle components such as the brakes or suspension system. Excessive weight may influence the behavior of the suspension system or braking system. The engine may also be affected by excessive weight. Data relating to these systems in response to the excess weight may be communicated to the FVC.

The range of allowable weights may be communicated to the driver in real-time, allowing the driver to make adjustments before proceeding. In some cases, the driver may choose to exceed even the highest allowable weight limits. In cases where the overage is not detected until the vehicle is already in motion, the OFVU may send audible and visual alerts to the driver that weight limits have been exceeded prior to any control actions.

In addition to reporting how weight affects components of the vehicle, the OFVU may also monitor the weight of trailers and associated towing equipment attached to the vehicle. For example, in some cases a tow vehicle without OFVU may be utilized to tow a trailer with OFVU. In this case, the trailer may have sensors and devices that monitor the weight of the trailer and its load. In this way, the FVC may be able to monitor the trailer weight. Other equipment related to the towing may also be monitored. In some cases, the weight of the trailer may be within limits, however the weight on the hitch (tongue weight) may exceed specifications. In this case, the FVC may alert the driver that the load on the trailer may need to be adjusted to reduce the tongue weight on the hitch. This alert may be automatically communicated to the driver via an app on their phone or mobile device.

The OFVU consists of software and/or firmware and other equipment or systems that enable the hardware and systems in a tow vehicle and/or in a trailer to determine the weight of the vehicle, trailer, and associated tow equipment. Data regarding weight data along with sensor data is communicated to the FVC. Both real-time and historical data is recorded and relayed to the FVC. The data may be sent wirelessly via a local network or a cloud network.

The OFVU may include one or more of the following components:
1. Software
2. Firmware
3. Hardware
4. Sensors—electrical, electro-mechanical, automotive, chemical, navigational, thermal
5. Accelerometers
6. Processor
7. Controller or microcontroller
8. Memory or other data storage device or module
9. Wireless network device
10. Mobile device The basic process of how the OFVU is used or implemented is as follows:

A user or FVC representative opens the OFVU app on a mobile device (or app "on-board" vehicle for OEM implementation) that prompts the user to indicate equipment included in the system. If the equipment included is a trailer, for example, the user is prompted to indicate that the trailer is part of the system and to include the trailer and its weight. In some embodiments, the trailer and its weight are recognized by the OFVU automatically so that no user interface is required. In other embodiments, the OFVU is automatically started every time the vehicle is driven and communicates to the vehicle control system the weight of the loads (both loads in the bed of a truck, for example along with the trailer weight). In certain embodiments, the OFVU includes sensors that recognize when equipment like a trailer is connected to the truck, and starts tracking the weight of the trailer as soon as it is hooked up.

In certain embodiments, the FVC may send alerts to the driver in real-time while driving indicating weights of loads in the vehicle and trailer weight. Any loads that are beyond recommended limits are thus known during the overloading event, and the driver may take action to adjust the loading.

In other embodiments, the OFVU may be implemented directly into the vehicle in a factory or OEM application. In other embodiments, the OFVU may be retrofitted to an existing vehicle. In a retrofit application, the OFVU may plug into the vehicle's OBD port to allow interface with the vehicle's control system. Alternatively, it may be connected wirelessly either via a wireless adapter to the OBD, or to other wireless interface devices that connect the OFVU to the vehicle's control systems.

In some embodiments, the OFVU may also be connected to other equipment attached to the vehicle. For example, a trailer may have sensors and allow control (trailer brakes) that may inform the OFVU. In this case, the OFVU may be connected to this equipment either by a hard-wire connection (via the trailer wiring connection to the vehicle) or wirelessly via wireless equipment mounted on the equipment and within the OFVU. In this way, further data regarding the behavior of a trailer may be learned by the OFVU through this connection to its sensors. Control of the equipment (application of the braking system for example) may also be done by the OFVU. The electrical trailer brake gain signal for example may be adjusted by the OFVU based on the load of the trailer. Information regarding pitch and roll of the trailer may also be communicated to the OFVU by sensors on the trailer. This information may be communicated to the driver and to the FVC.

The OFVU may also interface with autonomous or semi-autonomous vehicles, informing the control system regarding weight and the impact that weight has on the vehicle and its systems.

In certain embodiments, the OFVU may be implemented via a local or cloud-based network. The local network may comprise the vehicle, trailer and all associated tow equipment with a specific towing set-up. For example, each component and part of the towing system (vehicle, trailer, hitch, etc.) may have a wireless network device that links them together. In this way, the OFVU may communicate with all of the equipment in order to effectively monitor (via sensors) and control not only the vehicle but also the tow equipment.

In other embodiments, the OFVU may further comprise connection to a cloud network. For examples, user profiles, drive mode profiles, vehicle profiles, and system settings may be stored and accessed via a connection to the cloud. This connection may be via wireless devices or transmitter and receivers. In some embodiments, both monitoring and control of the OFVU may also be done via the cloud.

A mobile device may also be used for a user interface with the OFVU. In some cases, the processor in a mobile device along with other OFVU components may be comprised within the mobile device, and the mobile device may interface with the vehicle via a wireless connection. The mobile device may allow for user data or changes to the factory presets to be entered in. The mobile device may also be used as a scanner to scan in equipment ID's to identify the specific equipment being used.

In another embodiment, the user interface with the OFVU may be via the vehicle's infotainment system or other interface device on the dashboard of the vehicle.

FIG. 1 is an illustration depicting a car dashboard, steering wheel and shifter. The monitoring system 120 for determining a vehicle maintenance condition based on weight is shown behind the dashboard near the steering wheel. In some embodiments, the system 120 is an OEM product incorporated into the vehicle at the time of manufacture. In other embodiments, the system 120 may be connected to the vehicle via the OBD port 122 as an after-market component. In one embodiment, the OBD connector may have a wireless connection to the system. In another embodiment, the system may be plugged into the OBD port 122 with a wired connector.

In another embodiment, an after-market wireless device 130 may be attached to the vehicle. The vehicle may have a tow/haul button 124 on the dash of the vehicle. Other user interface devices may include an infotainment system 118, vehicle control system user interface buttons 114, or user interface panel 110. The purpose of these interface devices is to provide one or more methods for the user or driver to input settings, or to communicate to the monitoring system. The interface devices also provide a way for the system to communicate a maintenance condition and to alert the driver to changes in the maintenance condition or additional conditions detected by the system that require user intervention.

For example, the driver or user may enter the details of a trip prior to engaging the monitoring system. The monitoring system may determine that the trip entered and driver are authorized for the tow vehicle identified for the trip. At this point, the driver may then connect the tow vehicle to a trailer. The ratings of the trailer may not be high enough to handle the proposed load identified by the driver, and the system may alert the driver to select another trailer. The system may also communicate the required trailer ratings or type needed for the identified trip. In some embodiments, the system may automatically recognize the trailer prior to connection to the tow vehicle and alert the driver prior to hooking it up. In this way, the system may proactively assist the driver in the initial towing set-up. In some cases, the system may not allow the trailer to be used (by mechanically blocking the connection point, or not releasing locking mechanisms on the hitch or other physical restrictive means) if the ratings do not match the requirements for that trip.

In another embodiment, the monitoring system may allow certain drivers to operate only specified two vehicle and trailer set-ups. The system may notify the driver that they are not authorized, and may communicate other options (for example, propose a different set-up, or suggest other drivers that are allowed for the given set-up).

In certain cases, the monitoring system may further limit or control systems on the tow vehicle and trailer in response to loads and changes in the load. For example, the braking gain signal to the trailer may have a high setting at the beginning of the trip, and then after dropping off several loads, the system may determine that a lower gain signal may be sent to the trailer. At this point, the monitoring system may make an adjustment to the maintenance condition that reduces the trailer brake gain signal. The maintenance condition, therefore, may continue to change not only from trip to trip, or from vehicle to vehicle, but may also change during a trip while delivering goods or loads to various destinations within a given trip.

In an embodiment, the maintenance condition may control other systems within the tow vehicle or trailer that influence the life of the equipment. For example, if a given vehicle normally hauls very heavy load, the monitoring system may modify the maintenance condition to direct drivers to use other available tow vehicles for these higher load trips in order to spread the heavy use over several heavy duty tow vehicles rather than have the same vehicle doing the same heavy work every day and every trip. In another example, an individual tow vehicle may be controlled by the monitoring system in such a way to minimize wear due to heavy loads, and therefore reduce maintenance issues. For example, the tire pressure or braking may be modified to increase the safety of the system, but also reduce the effect a heavy load may have on the overall vehicle or equipment structure.

In an embodiment, a tow vehicle may slow down when approaching a curve in the road for example, and there may be less force on the suspension system, shocks, and braking system. This slowing down may be done by the monitoring system alerting the driver (communicating this via audible or visual means to the driver) to slow down. Alternatively, the system may send a control signal to the vehicle control system which directly carries out the slowing down of the vehicle. The braking system may be adjusted to apply more pressure to the brakes as required for the added load. The brake gain signal to the trailer may also be adjusted to match requirements for that specific trailer load. In some cases, the trailer load may be significantly higher than the tow vehicle load and may require more braking pressure than the tow vehicle. In this scenario, since the weights of both the tow vehicle and trailer are known by the on-board weight determination system, the system may then inform the braking system to apply the necessary braking to each of the brake components. In certain embodiments, sensor data may indicate different tire air pressure for each wheel and associated brake for that wheel. In order to improve safety in handling, the system may select a different braking setting for the wheel associated with the low air pressure tire. The system may further alert the driver to this occurrence along with how the maintenance condition were adjusted to compensate. These settings may be communicated to the monitoring station.

The monitoring station may determine that either the tow vehicle or trailer is in an overload condition that exceeds the ratings of the vehicle, trailer or associated tow equipment. The monitoring system may communicate these overload conditions to the user or driver of the vehicle. The user may then make adjustments to the load (i.e. remove some of the load to reduce the weight) in order to not exceed the ratings.

FIG. 2A is an illustration depicting one scenario demonstrating how the monitoring system 120 may be implemented for a specific truck pulling a flatbed trailer. System 120 may communicate via wireless signal 204. Truck 201 is shown hauling flatbed trailer 202. Trailer type and weight may be communicated by wireless device 220, and load 240 may be communicated to the system 120 via trailer wireless signal 224. Tongue weight may be determined by sensor 210 and communicated via wireless signal 212. Axle weight may be determined by sensor 230 and communicated via signal 234.

FIG. 2B shows a cloud 250 network communicating via wireless signal 252. The cloud may communicate to the system to store maintenance condition as a back-up for any memory loss to the vehicle mounted system components. System components may be redundantly included in the cloud, on the vehicle system component and on a mobile device. In this way, various system components that may be damaged or otherwise rendered inactive for any reason may be backed up by these redundant system components. For example, if a vehicle's computer or control system is damaged, a complete copy of all settings may be re-installed into a new replacement computer or control system. All relevant data and information including modeling for each set-up are communicated to the cloud 330. All settings, manufacturers ratings, set-ups and user input data may be stored in the cloud. In some embodiments, set-up information may be retained in the cloud and downloaded to the system after a system failure, or data loss.

FIG. 2C illustrates a mobile app on the mobile device 260 shown. In this embodiment, the monitoring system is on the mobile device and all interface between the tow vehicle and trailer is done wirelessly via signal 262.

FIG. 2D is an illustration of a wireless hub 270, which may function as a bridge or connecting device to a network. Wireless signal 272 may connect the hub 270 to the monitoring system.

Figures 3A, 3B, 3C:
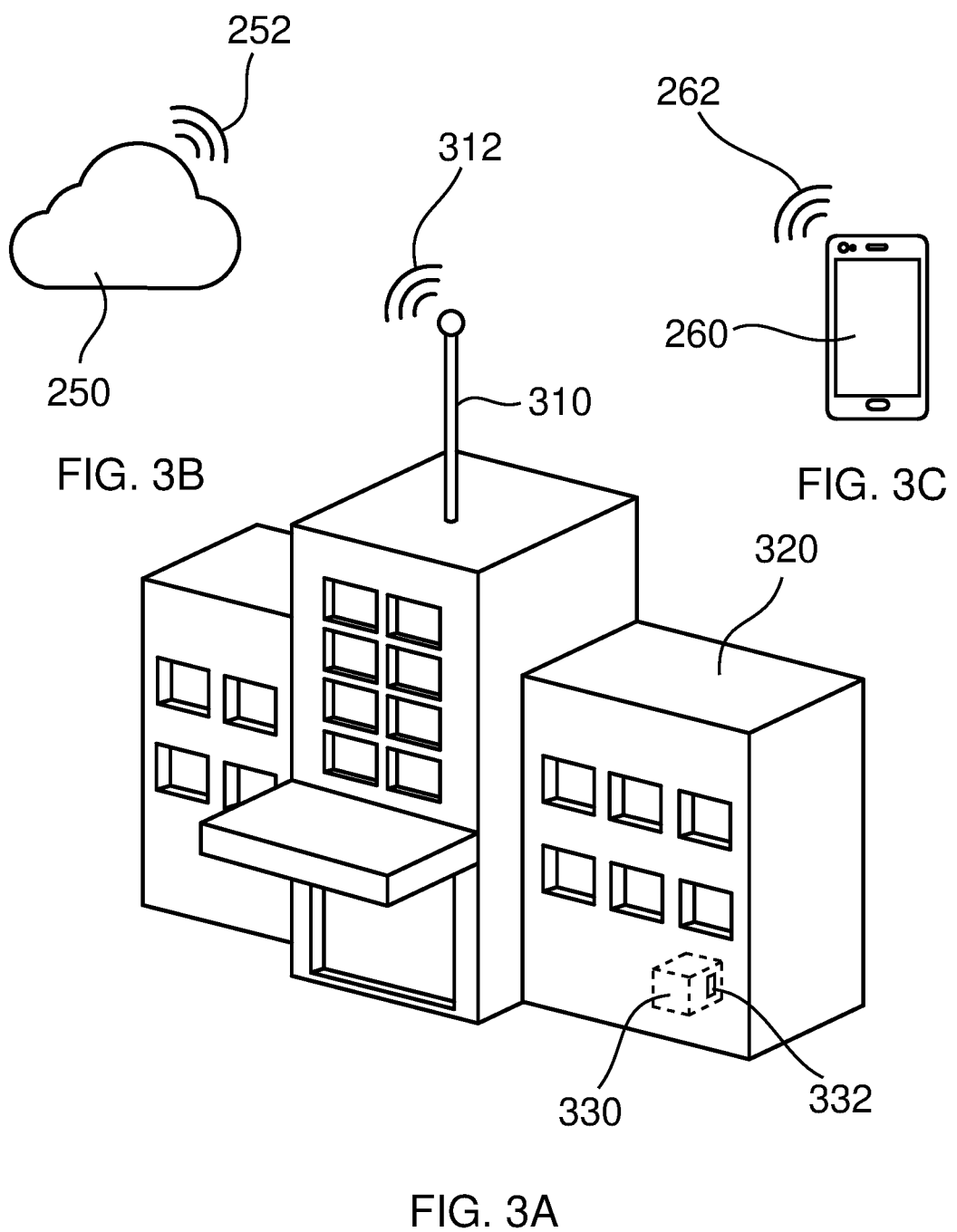
FIG. 3A is a perspective view of a monitoring station.
FIG. 3B shows a cloud network communicating via wireless signal.
FIG. 3C illustrates a mobile app on a mobile device.

FIG. 3A is a perspective view of a monitoring station 320 with antenna 310 that facilitates transmission of communication signal 312 to the monitoring system. The monitoring station equipment 330 may include the monitoring system, or may include a hub 332 or other network connection means to communicate to the monitoring system and the cloud 250.

FIG. 3B shows a cloud network communicating via wireless signal. In certain embodiments, the monitoring station 320 communicates to the monitoring system via the cloud 250 and wireless signal 252.

FIG. 3C illustrates a mobile app on a mobile device. Communication to the user may be received via wireless signal 262 to mobile device 260.

Figure 4:
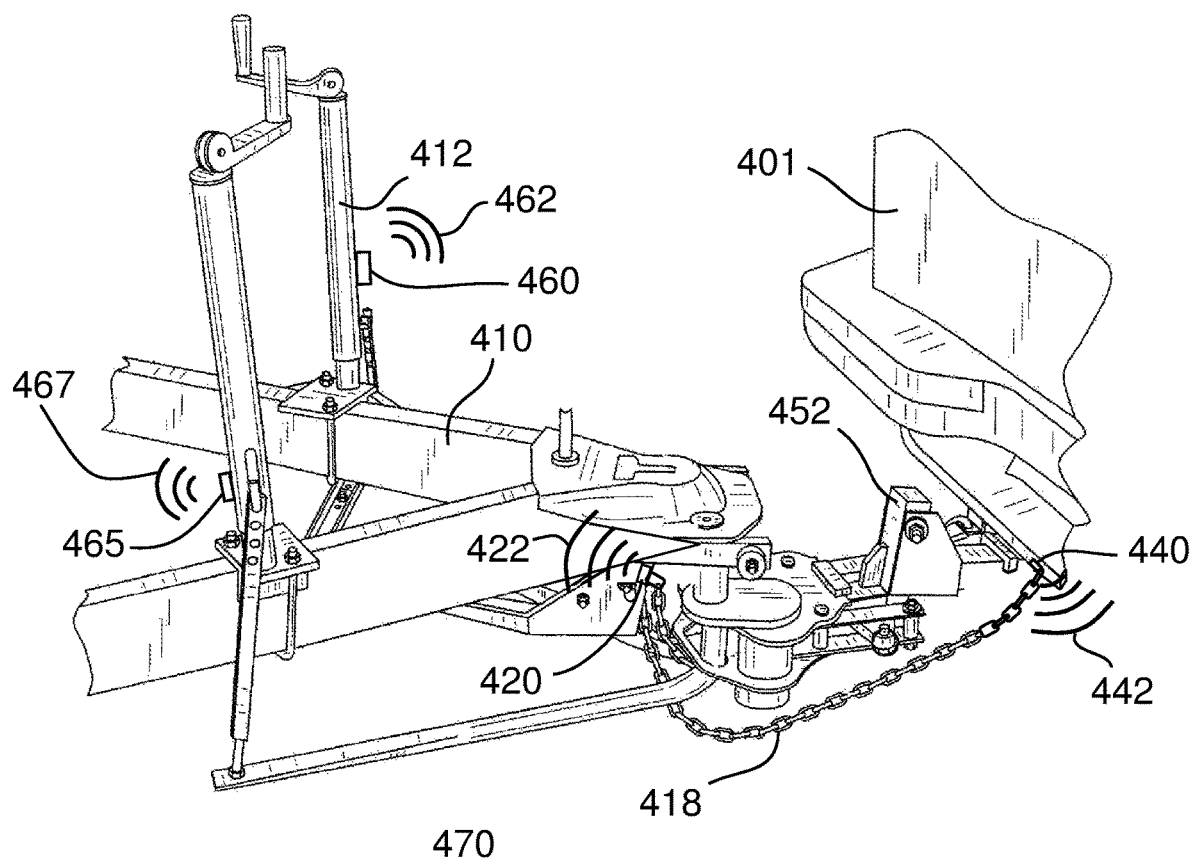
FIG. 4 is an illustration of a trailer hitch connected to the back of a truck.

FIG. 4 is an illustration of a trailer hitch connected to the back of a truck 401. Truck 401 has a receiver hitch 452 which is connected to trailer 410. In this embodiment, the receiver hitch 452 has a wireless device 440 for communication of data to the monitoring system. The trailer 410 also has a wireless transmission device 420. The monitoring system may automatically request notification from wireless device 440 via wireless signal 442, and wireless device 420 via wireless signal 422 as the trailer is hooked up. In some embodiments, device 440 may also include a sensor indicating that the chains 418 have been connected. The data informing the system may also include this chain connection data to assure that the safety chains 418 are in place before driving off. In a similar manner, jacks 412 may include sensors 460 and 465 that transmit signals 462 and 467 to the monitoring system alerting the system that the jacks are fully seated and in the correct position. In certain embodiments, jacks 412 and 413 may adjust anti-sway or stabilizer bars. The proper settings for this equipment may be communicated to the monitoring system. Any deviations from the correct set-up may be communicated to the user and to the monitoring station. The user may then have the option to make adjustments to the set-up to bring it into compliance with the recommended settings and equipment ratings before operating the vehicle.

Figure 5:
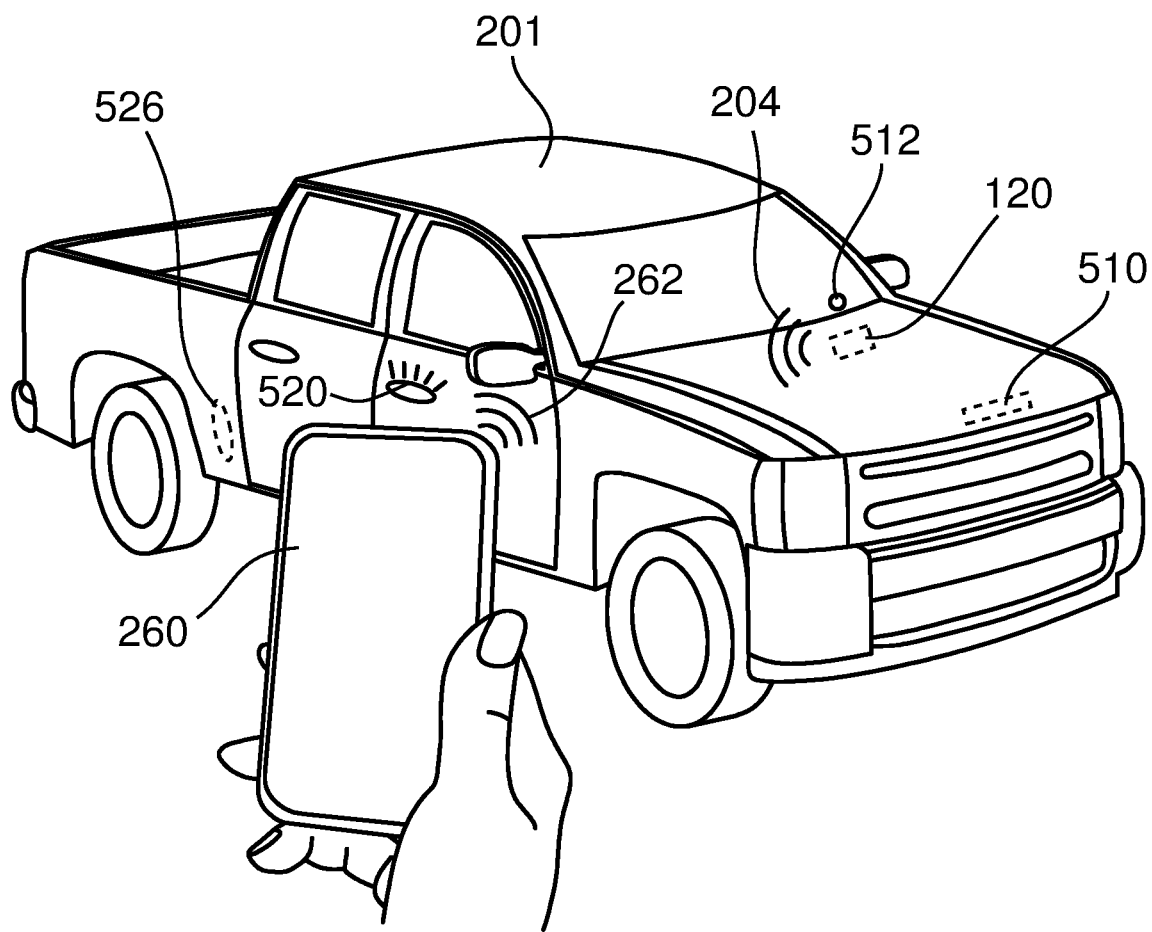
FIG. 5 is an illustration of a truck with the monitoring system being accessed by a mobile device.

FIG. 5 is an illustration of a truck with the monitoring system being accessed by a mobile device. In this example embodiment, the mobile device 260 may operate as a gatekeeper that allows or restricts access to the monitoring system 120. The mobile device may communicate via wireless signal 262 to the monitoring signal via wireless signal 204. The monitoring system 120 may allow a specific driver access by unlocking door lock 520. Once access to the truck 201 is given to the driver, the monitoring system 120 may further restrict access or control operation of vehicle systems such as the vehicle control system 510, or brakes 526 for example. Other driver interface controls such a selection switch 512 may also allow further control interface between the driver and the monitoring system 120.

Figure 6A:
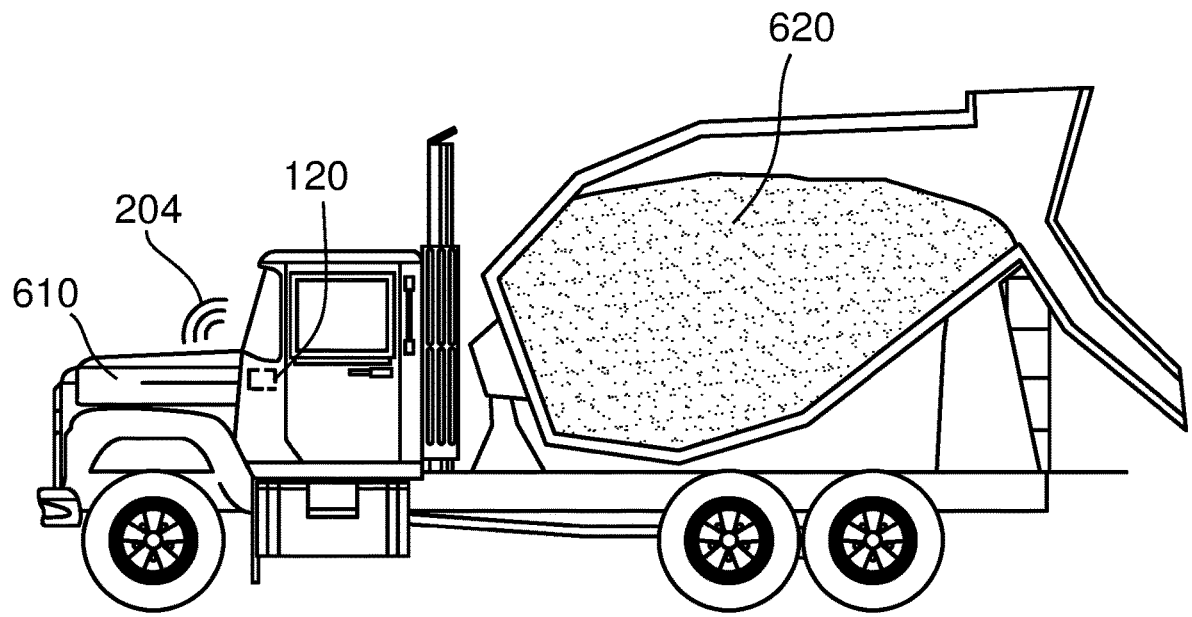
FIG. 6A illustrates a concrete truck with the monitoring system.

FIG. 6A illustrates a concrete truck with the monitoring system. As shown in this illustration, the concrete truck 610 is equipped with the monitoring system 610 and sends out a wireless signal 204 to the cloud network and mobile device for user control. The weight of the concrete 620 in the truck 610 is continuously monitored and updates to the load are carried out by the monitoring system at each stop that the truck drops off concrete. The new weight (load) is measured at each stop and the maintenance condition is modified to reflect this change at each stop.

Figure 6B:
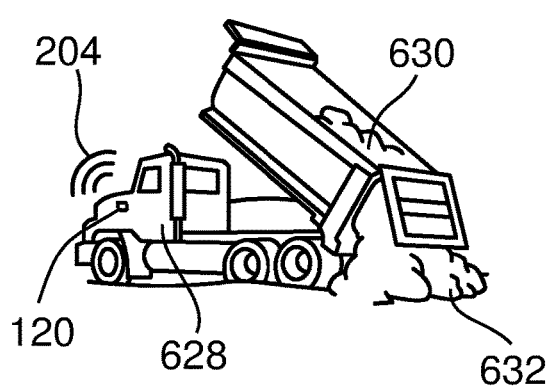
FIG. 6B illustrates a top soil delivery truck delivering the soil to a site.

FIG. 6B illustrates a top soil delivery truck delivering the soil to a site. The truck 628 is equipped with monitoring system 120 communicating via wireless signal 204. Partial load 630 is determined after a portion of the load 632 is dropped off at a delivery site. The new load is determined by the on-board weight determination system which communicates to the monitoring system which revises the maintenance condition.

Figure 6C:
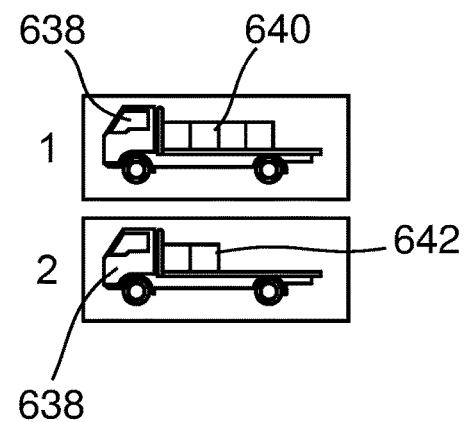
FIG. 6C illustrates a truck in two scenarios with different load bearing conditions.

FIG. 6C illustrates a truck in two scenarios with different load bearing conditions. The truck 638 in view 1 is at the beginning of a trip with four boxes 640 on the truck. The same truck 638 is shown in view 2 after delivering two of the four boxes, with two boxes 642 remaining. The new weight of these 2 boxes is determined by the monitoring system and the maintenance condition is updated accordingly. The beginning weight, and changes to the weight, along with the effect the weight has on the wear and tear of each system in the vehicle (brakes, suspension, etc.) are communicated to the system for updating the maintenance condition.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A monitoring system for determining a vehicle maintenance condition based on weight, comprising:
   a monitoring station comprising a communication module;
   a weight determination system comprising at least one sensor;
   a data input device configured to receive input data; and
   a processing device comprising a processor and non-volatile memory;
   wherein the processor is configured to:
      receive load ratings for a tow vehicle and tow equipment;
      receive maintenance requirements for the tow vehicle and the tow equipment;
      receive vehicle use requirements for the tow vehicle and the tow equipment;
      receive weight data from the weight determination system;

receive the input data from the data input device;
determine at least one maintenance condition based on the load ratings, the maintenance requirements, the vehicle use requirements, the weight data, and the input data;
send the at least one determined maintenance condition to the monitoring station; and
communicate the at least one determined maintenance condition to a user;
wherein the monitoring system sends at least one control command to a vehicle computer server.

2. The monitoring system of claim 1, wherein the at least one determined maintenance condition determines at least one vehicle maintenance task.

3. The monitoring system of claim 1, wherein the at least one determined maintenance condition determines at least one vehicle use restriction.

4. The monitoring system of claim 1, wherein the monitoring system:
receives at least one weight update at each stop along a trip; and
makes an adjustment to the at least one determined maintenance condition based on the weight update.

5. The monitoring system of claim 1, wherein the weight data comprises vehicle weight.

6. The monitoring system of claim 5, wherein the weight data further comprises trailer weight.

7. The monitoring system of claim 6, wherein the monitoring system restricts at least one of:
access to a tow vehicle based on the at least one determined maintenance condition; and
access to a trailer based on the at least one determined maintenance condition.

8. The monitoring system of claim 7, wherein the access restriction comprises at least one of:
locking out a specific user based on the at least one determined maintenance condition;
modifying vehicle operation controls based on the at least one determined maintenance condition;
restricting connection of a specific trailer to a specific tow vehicle;
requiring the specific user to enter load type via the input device; and
requiring the specific user to enter trip data.

9. The monitoring system of claim 1, wherein the at least one control command controls the operation of the tow vehicle based on the at least one determined maintenance conditions.

10. The monitoring system of claim 1, wherein the data input device is an OBD device connected by a plug-in connector to a vehicle OBD port.

11. The monitoring system of claim 1, wherein the data input device receives data from the at least one sensor.

12. The monitoring system of claim 1, wherein the monitoring station receives and transmits data via a wireless interface.

13. The monitoring system of claim 11, wherein the processor is configured to build a model of a set-up for a specific vehicle connected to a specific trailer;
wherein the model determines at least one maintenance mode based on the data associated with the set-up for the model;
wherein the model is stored in the non-volatile memory;
wherein the monitoring system receives user settings;
wherein the monitoring system communicates the at least one determined maintenance condition for the model to the vehicle control system; and
wherein the monitoring system alerts the user to the at least one determined maintenance condition for the model.

14. The monitoring system of claim 13, wherein the non-volatile memory stores factory settings and user settings specific to the model.

15. The monitoring system of claim 13, wherein the monitoring system further comprises a cloud-based network;
wherein factory settings, the user settings and the sensor data are stored in the memory of the cloud-based network;
wherein the cloud-based network processor is configured to:
determine set-up specific maintenance condition for a specific towing set-up of tow vehicle, trailer and all associated tow equipment; and
transmit the set-up specific maintenance condition to the monitoring system based on the sensor data, the factory settings, and the user settings.

16. The monitoring system of claim 1, wherein the data input device comprises a cell phone, satellite phone, smartphone, personal digital assistant, tablet computer, laptop computer, remote control device, mobile transmitter, a mobile internet device or a combination of one or more of the same.

17. The monitoring system of claim 13, wherein the processor converts data from the at least one sensor to an electrical signal; and wherein the one or more sensors comprise at least one of: electromagnetic, electrochemical, electric current, electric potential, magnetic, radio, air flow, accelerometers, pressure, electro-acoustic, electro-optical, photoelectric, electrostatic, thermoelectric, radio-acoustic, environmental, moisture, humidity, fluid velocity, position, angle, displacement, or combinations thereof.

18. The monitoring system of claim 13, wherein the monitoring system further:
monitors, via the one or more sensors, behavior of a vehicle and its components while driving on a specific trip;
makes adjustments to the maintenance mode and the model for the specific trip based on the specific trip sensor data and input data; and
stores, in the non-volatile memory, an adjusted maintenance mode model based on the adjustments.

* * * * *